United States Patent [19]

Leistra, Jr. et al.

[11] 4,328,612

[45] May 11, 1982

[54] TRIM BEZEL INSTALLATION TOOL

[75] Inventors: Philip W. Leistra, Jr., Madison Heights; Robert M. Barnes, Rochester, both of Mich.

[73] Assignee: General Motors Corporation, Detroit, Mich.

[21] Appl. No.: 161,160

[22] Filed: Jun. 19, 1980

[51] Int. Cl.³ ........................ B23P 19/00; B23P 11/00

[52] U.S. Cl. .................................. 29/802; 29/243.52; 72/125

[58] Field of Search ............. 29/243.5, 243.52, 243.53, 29/283.5, 802, 523, 243.56, 243.58; 72/112, 115, 125

[56] References Cited

U.S. PATENT DOCUMENTS

| | | | |
|---|---|---|---|
| 1,234,680 | 7/1917 | Lowy | 72/125 X |
| 1,478,692 | 12/1923 | Baranoff | 72/112 X |
| 1,557,845 | 10/1925 | Johnston | 29/243.52 |
| 2,781,934 | 2/1957 | Caswell | 72/125 |
| 3,406,556 | 10/1968 | Musser | 72/391 |
| 4,175,735 | 11/1979 | Griffin | 269/49 |

FOREIGN PATENT DOCUMENTS

| | | | |
|---|---|---|---|
| 975742 | 3/1951 | France | 72/112 |

*Primary Examiner*—Ervin M. Combs
*Attorney, Agent, or Firm*—R. L. Phillips

[57] ABSTRACT

A bezel installation tool is disclosed for blind securing bezels in a panel. The tool includes a rotary striker, bezel holder and load spring. As tabs on the bezel are bent over by the striker, the holder and spring clench the bezel about the edge of the opening.

3 Claims, 5 Drawing Figures

TRIM BEZEL INSTALLATION TOOL

TECHNICAL FIELD

This invention relates to a tool for securing a bezel in an aperture and more specifically relates to the securing of a trim bezel in a vehicle wheel in a manner preventing rattle of the bezel, the installation being accomplished by the insertion of a tool through the aperture and rotating the tool against securing flanges clenching them to the inside surface of the wheel.

The mounting and securing a trim bezel or eyelet in a panel aperture in the past has necessarily required a complicated procedure. The procedure of placing the bezel with its flange engaging one surface of the panel and the retaining of the bezel in such a position while clenching fastening flanges against panel surfaces on an opposite side has created considerable difficulty. In most situations this installation has been accomplished through the use of relatively complicated fixed machinery. In fact, the machinery utilized to perform this function necessarily has involved considerable weight to provide stability and the requisite clenching power. In many instances it has been desirable to have a portable device for conveniently installing bezels or eyelets at a particular location. While the art of spinning to set eyelets in a particular panel structure having only one side accessible has been known for many years, it does not appear to have ever succeeded commercially to any extent. It appears that this may be due to the relative complexity and cumbersomeness of earlier spinning devices wherein the source of power in conjunction with the axial clenching force made use of a portable tool impractical.

THE INVENTION

This invention provides a bezel or eyelet installation tool utilizing a bezel or eyelet holder member forming an anvil and having an aperture therethrough receiving an axially movable mandrel supporting a rotating striker member on one end and being provided with a portable tool driving socket on the other end. A load spring is provided between the holder and the tool driving socket on the mandrel such that the striker is preloaded against fastening flanges on a bezel or eyelet when the latter is placed in a panel aperture. The preloading force is applied to the bezel or eyelet by the holder engaging flanges on the bezel or eyelet on one side of the panel surface while the striker is rotated against cam surfaces on the fastening flanges and clenches the flanges against the underneath side of the panel surface thereby tightly securing the bezel or eyelet to the panel preventing rattle of the bezel or eyelet during operation of a particular device. This invention has particular application to the installation of trim bezels in apertures in a vehicle wheel. A particular advantage of the subject inventive installation tool resides in the fact that it can be driven by the usual air actuated tool that is used to secure lug nuts to the wheels as the vehicle moves on the assembly line. The identical socket can be provided on the mandrel of the installation tool such that the bezel can be placed in the wheel aperture, the tool inserted through the aperture so that the striker engages the fastening flanges on the bezel with the anvil in engagement with the outer trim flange of the bezel. The air gun can then be inserted into the socket in the mandrel rotating the striker drawing the fastening flanges against the underneath side of the wheel surface due to the preload applied by the load spring as previously mentioned.

The details as well as other features and advantages of the invention are set forth in the remainder of this specification and are shown in the drawing.

THE DRAWING

BEST MODE FOR CARRYING OUT THE INVENTION

Figure 1:
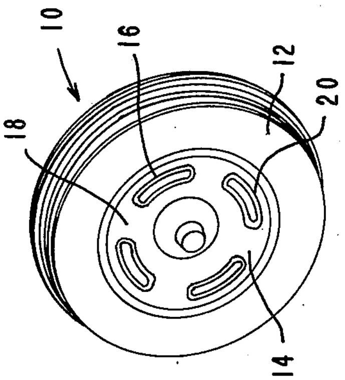
FIG. 1 is a perspective view of a wheel assembly illustrating trim bezels secured in wheel apertures.

Referring to FIG. 1, a vehicle wheel assembly 10 is shown including a tire 12 mounted upon a wheel 14 having a plurality of apertures 16 in the wheel web portion 18. The peripheral edges of the wheel apertures 16 are covered by trim bezels 20 to enhance the appearance of the wheel assembly. It is the trim bezel design 20 and a later described installation tool that are the subjects of this invention.

Figure 2:
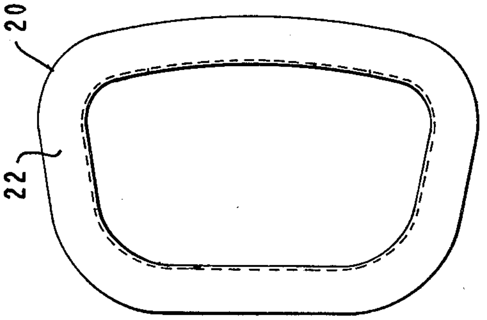
FIG. 2 is a plan view of a bezel prior to its installation into the vehicle wheel.
Figure 3:
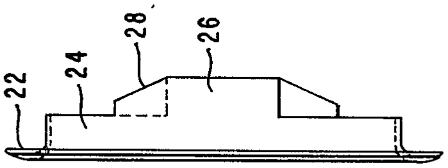
FIG. 3 is an end view of a trim bezel illustrating the fastening flanges and the cam ramp surfaces on the flanges for engagement by the rotating striker.

As shown in FIG. 2, the trim bezel 20 includes a peripheral flange 22 which engages the wheel web 14 when installed as shown in FIG. 1. Additionally, the trim bezel 20 is formed to conform to the aperture in the wheel and obviously can be of any suitable configuration. With reference to FIG. 3 the trim bezel includes an axially extending rim portion 24 having fastening flanges 26 formed thereon. The rim 24 can be formed to include two or more of the fastening flanges 26. The fastening flanges are of a configuration including a ramp 28 which is provided for a purpose to be later described.

Figure 4:
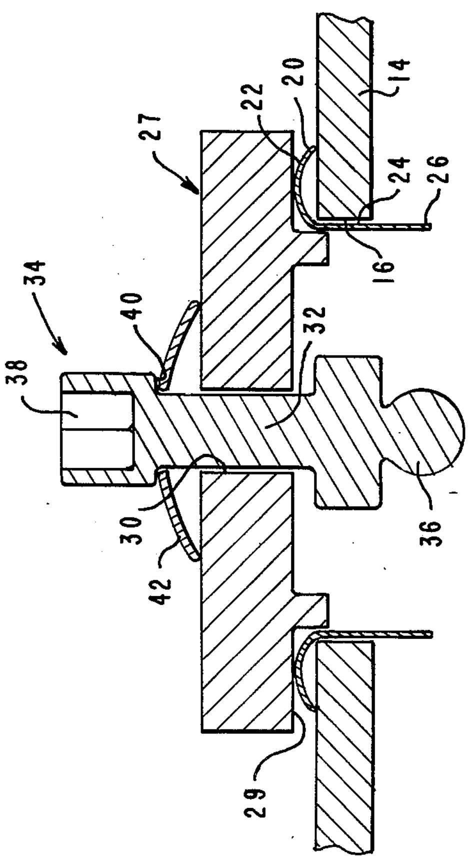
FIG. 4 is a partial sectional view illustrating the bezel disposed within a wheel aperture with the striker inserted through the aperture and the anvil in engagement with flanges on the trim bezel.

Referring now to FIG. 4, the trim bezel 20 is shown in position in the wheel panel 14 with the rim 24 positioned adjacent the peripheral edges of a wheel aperture 16. The trim flange 22 overlies the exterior surface of wheel panel 14 and is engaged by a bezel holder member 27 providing an anvil surface 29 which is in contact with the bezel flange 22. The bezel holder 27 contains an aperture 30 receiving a mandrel portion 32 of a rotating tool assembly 34 which includes a striker portion 36 and a tool receiving socket 38. The rotating tool 34 is formed to provide a shoulder 40 adjacent the tool receiving socket 38 which is engaged by a loading spring 42 which continuously biases anvil surface 29 of bezel holder 27 into engagement with flange 22 of trim bezel 20 when the tool assembly is placed within aperture 16 of the wheel panel 14.

Figure 5:
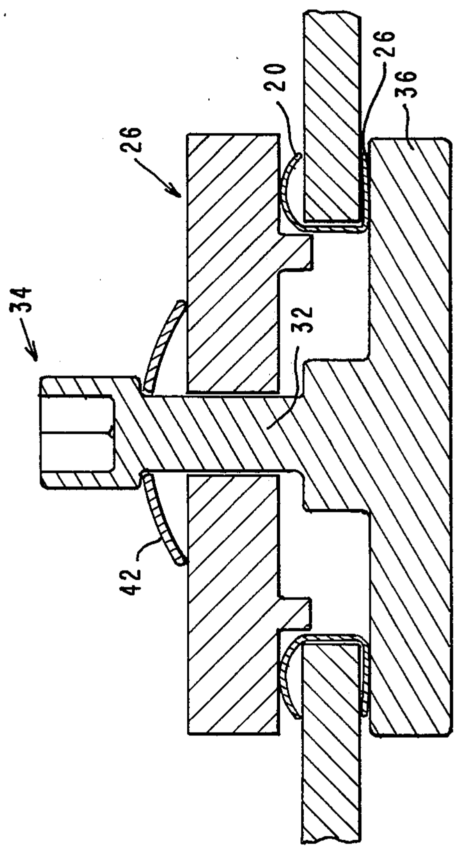
FIG. 5 is a partial section view illustrating the bezel clenched in place and showing the striker member rotated 90° to the position of FIG. 4.

In operation, with a bezel 20 placed in a wheel aperture 16 and the tool 34 pressed into engagement with the bezel, the striker 36 can then be positioned for rotation against fastening flanges 26. Placement of a driving shank of an air gun, not shown, and of the type used to secure wheel nuts when mounting the wheel upon a vehicle necessarily applies a force against spring 42. A sufficient force against the spring 42 permits movement of mandrel portion 32 axially within aperture 30 so that striker 36 is positioned below rim 24. Rotation of the striker by the air gun in combination with a relaxation of the axial force by the air gun operator permits spring 42 to move striker 36 upwardly in FIG. 4 into engagement with ramps 28 and deflect them radially outwardly of the wheel aperture 16. A sufficient period of rotation of the striker 36 in combination with a sufficient relaxing of axial force against spring 42 permits the latter to draw the striker upwardly until the fastening flanges 26 are bent back against the inner side of wheel 14 as is illustrated in FIG. 5.

Obviously, the tool assembly 34 can be configured to suit a particular use and the mandrel portion 32 and spring 42 can be of various forms permitting the striker 36 to be inserted and removed from apertures of various shapes.

The embodiments of the invention in which an exclusive property or privilege is claimed are defined as follows:

1. A bezel installation tool for blind securing bezels and eyelets in an aperture in a panel by deforming and clenching bezel and eyelet fastening flanges on an inside surface of said panel surrounding said aperture comprising a bezel and eyelet holder forming an anvil, said holder having an aperture therethrough, a striker having a mandrel mounted in said holder aperture and axially movable therein, a rotating tool connecting device on an end of said mandrel opposite from said striker and a load spring engaging said tool connecting device and said holder preloading said striker against said bezel and eyelet fastening flanges when one of them is placed in the panel aperture and the tool is in position with the striker placed inside the panel whereby rotation of the striker by a tool connected to the striker through said connecting device rotates said striker against the flanges clenching them against said inside panel surface tightly securing the bezel and eyelet to the panel.

2. A bezel installation tool for blind securing a bezel in an aperture in a vehicle wheel panel by deforming and clenching bezel fastening flanges on an inside surface of said wheel panel surrounding said aperture comprising a bezel holder forming an anvil, said holder having an aperture therethrough, a striker in the form of a rotating rod shaped member and having a mandrel mounted in said holder aperture, said mandrel being axially movable in said holder aperture, a tool socket formed in said mandrel at an end opposite from said rotating striker, and a load spring engaging said tool socket portion on said mandrel and said holder preloading said striker against fastening flanges on the bezel when the bezel is placed in said panel aperture and the tool is in position with the striker placed inside the wheel panel whereby rotation of the striker by a tool drivingly connected to the mandrel through said socket portion, the rotation of the striker clenching the flanges against the inside surface of the wheel while the spring tightly biases the striker against the flanges thereby tightly securing and preloading the bezel in the wheel aperture.

3. A bezel installation tool for blind securing a bezel in an aperture in a vehicle wheel by deforming and clenching fastening flanges on the bezel having cam ramp surfaces thereon for engagement by a rotating striker, the fastening flanges being clenched on an inside surface of the wheel surrounding said aperture thereby securely fastening the bezel in the wheel aperture for ornamental purposes, the tool comprising; a bezel holder forming an anvil surface, said holder having an aperture therethrough and being substantially in the form of the bezel being installed to provide uniform contact on one side of the bezel member, a striker having a mandrel mounted in said holder aperture and being axially movable therein, a socket formed in said mandrel opposite of said striker, said socket being formed to accommodate a driving end of a rotating tool for rotation of the striker as desired, said holder having positioning lugs formed on a side engaging said bezel for positioning said holder and said bezel within the wheel aperture, and a dish-shaped load spring engaging a shoulder on said socket portion and engaging the holder on a side opposite said bezel engaging surface applying a preload force between said striker and said holder when the bezel is placed in the wheel aperture and the tool is in position with the striker placed inside the wheel whereby rotation of the striker by a tool engaging said socket portion rotates the striker into engagement with cam surfaces on said fastening flanges clenching them against the wheel inside surface tightly securing the bezel to the wheel in a rattle free manner.

* * * * *